United States Patent [19]
Vellanki et al.

[11] Patent Number: 5,999,979
[45] Date of Patent: Dec. 7, 1999

[54] METHOD AND APPARATUS FOR DETERMINING A MOST ADVANTAGEOUS PROTOCOL FOR USE IN A COMPUTER NETWORK

[75] Inventors: Srinivas Prasad Vellanki, Milpitas; Anthony William Cannon, Mountain View; Hemanth Srinivas Ravi, Milpitas; Anders Edgar Klemets, Sunnyvale, all of Calif.

[73] Assignee: Microsoft Corporation, Redmond, Wash.

[21] Appl. No.: 08/818,769

[22] Filed: Mar. 14, 1997

Related U.S. Application Data

[60] Provisional application No. 60/036,661, Jan. 30, 1997, and provisional application No. 60/036,662, Jan. 30, 1997.

[51] Int. Cl.$^6$ ........................................... G06F 15/16
[52] U.S. Cl. .................................... 709/232; 709/237
[58] Field of Search ..................... 395/200.57, 200.58, 395/200.6, 200.76, 200.62; 710/11; 709/228, 227, 230, 231, 232, 237

[56] References Cited

U.S. PATENT DOCUMENTS

| | | | |
|---|---|---|---|
| 4,931,250 | 6/1990 | Greszczuk | 375/8 |
| 5,202,899 | 4/1993 | Walsh | 375/8 |
| 5,349,649 | 9/1994 | Iijima | 395/275 |
| 5,557,724 | 9/1996 | Sampat et al. | 395/157 |
| 5,687,174 | 11/1997 | Edem et al. | 370/446 |

*Primary Examiner*—Stuart S. Levy
*Assistant Examiner*—Kenneth W. Fields
*Attorney, Agent, or Firm*—Schwegman, Lundberg, Woessner & Kluth P.A.

[57] ABSTRACT

A method in a computer network for automatically detecting a most advantageous protocol for communication by a client computer, said client computer being configured to be coupled to a server computer via a computer network. The method includes initiating a plurality of protocol threads for sending from the client computer to the server computer, a plurality of data requests. Each of the data requests employs a different protocol and a different connection. The data requests are configured to solicit, responsive to the data requests, a set of responses from the server computer. Each of the responses employs a protocol associated with a respective one of the data requests. The method further includes receiving at the client computer at least a subset of the responses. The method also includes initiating a control thread at the client computer. The control thread monitors the subset of the responses as each response is received from the server computer to select the most advantageous protocol from protocols associated with the subset of the responses, wherein the most advantageous protocol is determined based on a predefined protocol priority.

23 Claims, 11 Drawing Sheets

METHOD AND APPARATUS FOR DETERMINING A MOST ADVANTAGEOUS PROTOCOL FOR USE IN A COMPUTER NETWORK

This application claims priority under 35 U.S.C 119 (e) of a provisional application entitled "VCR CONTROL FUNCTIONS" filed Jan. 30, 1997 by inventors Anthony W. Cannon, Anders E. Klemets, Hemanth S. Ravi, and David del Val (application Ser. No. 60/036,661) and a provisional application entitled "METHODS AND APPARATUS FOR AUTODETECTING PROTOCOLS IN A COMPUTER NETWORK" filed Jan. 30, 1997 by inventors Anthony W. Cannon, Anders E. Klemets, Hemanth S. Ravi, and David del Val (application Ser. No. 60/036,662).

CROSS REFERENCE TO RELATED APPLICATIONS

This application is related to co-pending U.S. application Ser. No. 08/818,805, filed on Mar. 14, 1997, entitled "Method and Apparatus for Implementing Motion Detection in Video Compression", U.S. application Ser. No. 08/819,507, filed Mar. 14, 1997, entitled "Digital Video Signal Encoder and Encoding Method", U.S. application Ser. No. 08/818,804, filed on Mar. 14, 1997, entitled "Production of a Video Stream with Synchronized Annotations over a Computer Network", U.S. application Ser. No. 08/819,586, filed on Mar. 14, 1997, entitled "Method and Apparatus for Implementing Control Functions in a Streamed Video Display System", U.S. application Ser. No. 08/818,769, filed on Mar. 14, 1997, entitled "Method and Apparatus for Automatically Detecting Protocols in a Computer Network," U.S. application Ser. No.08/818,127, filed on Mar. 14, 1997, entitled "Dynamic Bandwidth Selection for Efficient Transmission of Multimedia Streams in a Computer Network," U.S. application Ser. No. 08/819,585, filed on Mar. 14, 1997, entitled "Streaming and Display of a Video Stream with Synchronized Annotations over a Computer Network", U.S. application Ser. No. 08/818,664, filed on Mar. 14, 1997, entitled "Selective Retransmission for Efficient and Reliable Streaming of Multimedia Packets in a Computer Network", U.S. application Ser. No. 08/819,579, filed Mar. 14, 1997, entitled "Method and Apparatus for Table-Based Compression with Embedded Coding", U.S. application Ser. No. 08/818,826, filed on Mar. 14, 1997, entitled "Digital Video Signal Encoder and Encoding Method", all filed concurrently herewith, U.S. application Ser. No. 08/822,156, filed on Mar. 17, 1997, entitled "Method and Apparatus for Communication Media Commands and Data Using the HTTP Protocol", provisional U.S. application Ser. No. 60/036,662, filed on Jan. 30, 1997, entitled "Methods and Apparatus for Autodetecting Protocols in a Computer Network" U.S. application Ser. No. 08/625,650, filed on Mar. 29, 1996, entitled "Table-Based Low-Level Image Classification System", U.S. application Ser. No. 08/714,447, filed on Sep. 16, 1996, entitled "Multimedia Compression System with Additive Temporal Layers", and is a continuation-in-part of U.S. application Ser. No. 08/623,299, filed on Mar. 28, 1996, entitled "Table-Based Compression with Embedded Coding", which are all incorporated by reference in their entirety for all purposes.

BACKGROUND OF THE INVENTION

The present invention relates to data communication in a computer network. More particularly, the present invention relates to improved methods and apparatus for permitting a client computer in a client-server architecture computer network to automatically detect the most advantageous protocol, among the protocols available, for use in communicating with the server irrespective whether there exist firewalls or proxies in the network.

Client-server architectures are well known to those skilled in the computer art. For example, in a typical computer network, one or more client computers may be coupled to any number of server computers. Client computers typically refer to terminals or personal computers through which end users interact with the network. Server computers typically represent nodes in the computer network where data, application programs, and the like, reside. Server computers may also represent nodes in the network for forwarding data, programs, and the likes from other servers to the requesting client computers.

To facilitate discussion, FIG. 1 illustrates a computer network 100, representing for example a subset of an international computer network popularly known as the Internet. As is well known, the Internet represents a well-known international computer network that links, among others, various military, governmental, educational, nonprofit, industrial and financial institutions, commercial enterprises, and individuals. There are shown in FIG. 1 a server 102, a server 104, and a client computer 106. Server computer 104 is separated from client computer 106 by a firewall 108, which may be implemented in either software or hardware, and may reside on a computer and/or circuit between client computer 106 and server computer 104.

Firewall 108 may be specified, as is well known to those skilled in the art, to prevent certain types of data and/or protocols from traversing through it. The specific data and/or protocols prohibited or permitted to traverse firewall 108 depend on the firewall parameters, which are typically set by a system administrator responsible for the maintenance and security of client computer 106 and/or other computers connected to it, e.g., other computers in a local area network. By way of example, firewall 108 may be set up to prevent TCP, UDP, or HTTP (Transmission Control Protocol, User Datagram Protocol, and Hypertext Transfer Protocol, respectively) data and/or other protocols from being transmitted between client computer 106 and server 104. The firewalls could be configured to allow specific TCP or UDP sessions, for example outgoing TCP connection to certain ports, UDP sessions to certain ports, and the like.

Without a firewall, any type of data and/or protocol may be communicated between a client computer and a server computer if appropriate software and/or hardware are employed. For example, server 102 resides on the same side of firewall 108 as client computer 106, i.e., firewall 108 is not disposed in between the communication path between server 102 and client computer 106. Accordingly, few, if any, of the protocols that client computer 106 may employ to communicate with server 102 may be blocked.

As is well known to those skilled in the art, some computer networks may be provided with proxies, i.e., software codes or hardware circuitries that facilitate the indirect communication between a client computer and a server around a firewall. With reference to FIG. 1, for example, client computer 106 may communicate with server 104 through proxy 120. Through proxy 120, HTTP data, which may otherwise be blocked by firewall 108 for the purpose of this example, may be transmitted between client computer 106 and server computer 104.

In some computer networks, one or more protocols may be available for communication between the client computer and the server computer. For certain applications, one of these protocols, however, is often more advantageous, i.e., suitable, than others. By way of example, in applications involving real-time data rendering (such as rendering audio, video, and/or annotation data as they are streamed from a server, as described in above-referenced U.S. patent application Ser. Nos. 08/818,804 and 08/819,585 (Atty: Docket No.: VXT710)), it is highly preferable that the client computer executing that application selects a protocol that permits the greatest degree of control over the transmission of data packets and/or enables data transmission to occur at the highest possible rate. This is because these applications are fairly demanding in terms of their bit rate and connection reliability requirements. Accordingly, the quality of the data rendered, e.g., the video and/or audio clips played, often depends on whether the user has successfully configured the client computer to receive data from the server computer using the most advantageous protocol available.

In the prior art, the selection of the most advantageous protocol for communication between client computer 106 and server computer 104 typically requires a high degree of technical sophistication on the part of the user of client computer 106. By way of example, it is typically necessary in the prior art for the user of client computer 106 to understand the topology of computer network 100, the protocols available for use with the network, and/or the protocols that can traverse firewall 108 before that user can be expected to configure his client computer 106 for communication.

This level of technical sophistication is, however, likely to be beyond that typically possessed by an average user of client computer 106. Accordingly, users in the prior art often find it difficult to configure their client computers even for simple communication tasks with the network. The difficulties may be encountered for example during the initial setup or whenever there are changes in the topology of computer network 100 and/or in the technology employed to transmit data between client computer 106 and server 104. Typically, expert and expensive assistance is required, if such assistance is available at all in the geographic area of the user.

Furthermore, even if the user can configure client computer 106 to communicate with server 104 through firewall 108 and/or proxy 120, there is no assurance that the user of client computer 106 has properly selected, among the protocols available, the most advantageous protocol communication (e.g., in terms of data transmission rate, transmission control, and the like). As mentioned earlier, the ability to employ the most advantageous protocol for communication, while desirable for most networking applications, and is particularly critical in applications such as real-time data rendering (e.g., rendering of audio, video, and/or annotation data as they are receive from the server). If a less than optimal protocol is chosen for communication, the quality of the rendered data ,e.g., the video clips and/or audio clips, may suffer.

In view of the foregoing, there are desired improved techniques for permitting a client computer in a client-server network to efficiently, automatically, and appropriately select the most advantageous protocol to communicate with a server computer.

SUMMARY OF THE INVENTION

The invention relates, in one embodiment, to a method in a computer network for automatically detecting a most advantageous protocol for communication by a client computer. The client computer is configured to be coupled to a server computer via a computer network. The method includes sending from the client computer to the server computer, a plurality of data requests. Each of the data requests employs a different protocol and a different connection. The data requests are configured to solicit, responsive to the data requests, a set of responses from the server computer. Each of the responses employs a protocol associated with a respective one of the data requests.

The method further includes receiving at the client computer at least a subset of the responses. The method also includes monitoring the subset of the responses as each response is received from the server computer to select the most advantageous protocol from protocols associated with the subset of the responses, wherein the most advantageous protocol is determined based on a predefined protocol priority.

In another embodiment, the invention relates to a method in a computer network for automatically detecting a most advantageous protocol for communication by a client computer. The client computer is configured to be coupled to a server computer via a computer network. The method includes sending from the client computer to the server computer, a plurality of data requests. Each of the data requests employs a different protocol and a different connection.

The method further includes receiving at least a subset of the data requests at the server computer. The method additionally includes sending a set of responses from the server computer to the client computer. The set of responses is responsive to the subset of the data requests. Each of the responses employs a protocol associated with a respective one of the subset of the data requests. The method also includes receiving at the client computer at least a subset of the responses. There is further included selecting, for the communication between the client computer and the server computer, the most advantageous protocol from protocols associated with the subset of the responses, wherein the most advantageous protocol is determined based on a predefined protocol priority.

In yet another embodiment, the invention relates to a computer readable medium containing computer-readable instructions for automatically detecting a most advantageous protocol for communication by a client computer. The client computer is configured to be coupled to a server computer via a computer network. The computer-readable instructions comprise computer readable instructions for sending in a substantially parallel manner, from the client computer to the server computer, a plurality of data requests. Each of the data requests employs a different protocol and a different connection. The data requests are configured to solicit, responsive to the data requests, a set of responses from the server computer. Each of the responses employs a protocol associated with a respective one of the data requests.

The computer readable medium further includes computer readable instructions for receiving at the client computer at least a subset of the responses. There is further included computer readable instructions for monitoring the subset of the responses as each response is received from the server computer to select the most advantageous protocol from protocols associated with the subset of the responses, wherein the most advantageous protocol is determined based on a predefined protocol priority.

These and other features of the present invention will be described in more detail below in the detailed description of the invention and in conjunction with the following figures.

BRIEF DESCRIPTION OF THE DRAWINGS

To facilitate discussion.

DETAILED DESCRIPTION OF THE PREFERRED EMBODIMENTS

Figure 1:
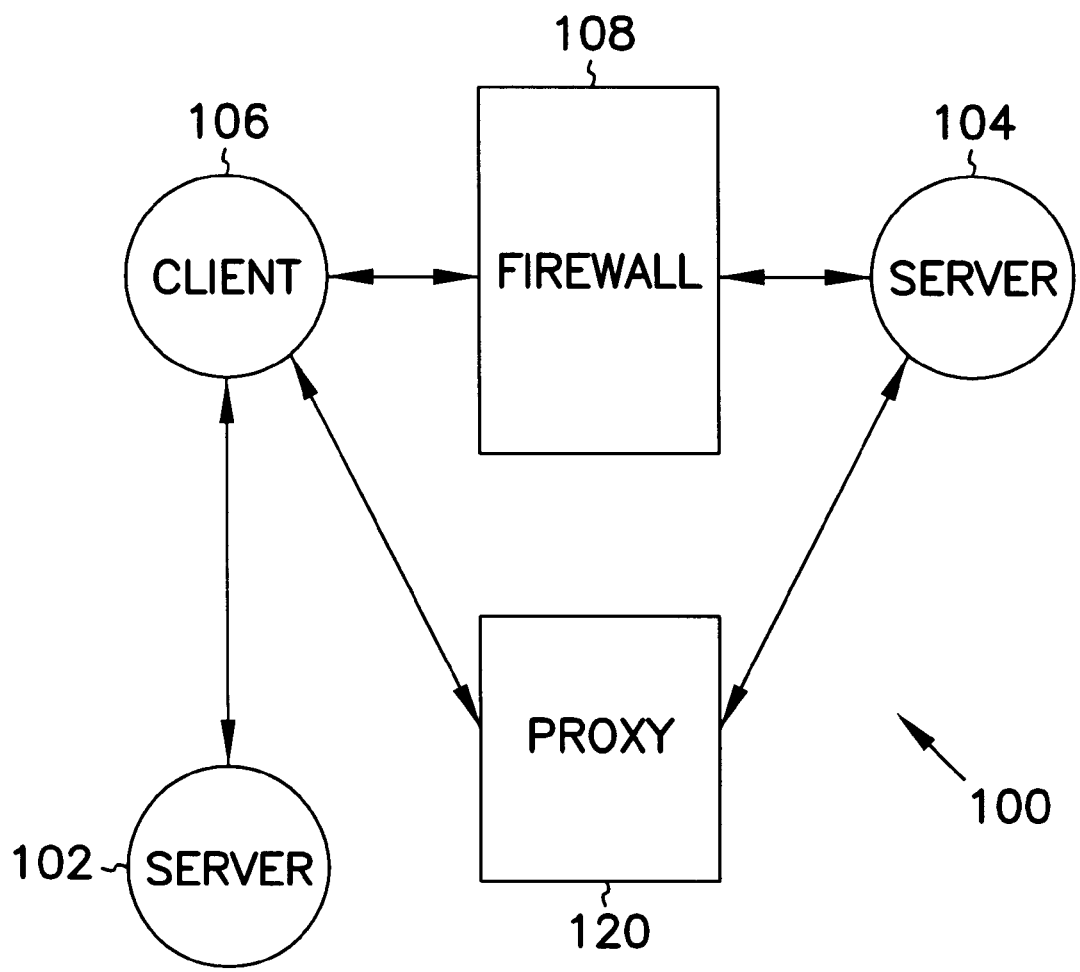
FIG. 1 illustrates a computer network, representing for example a portion of an international computer network popularly known as the Internet.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

In accordance with one aspect of the present invention, the client computer in a heterogeneous client-server computer network (e.g., client computer 106 in FIG. 1) is provided with an autodetect mechanism. When executed, the autodetect mechanism advantageously permits client computer 106 to select, in an efficient and automatic manner, the most advantageous protocol for communication between the client computer and its server. Once the most advantageous protocol is selected, parameters pertaining to the selected protocol are saved to enable the client computer, in future sessions, to employ the same selected protocol for communication.

In accordance with one particular advantageous embodiment, the inventive autodetect mechanism simultaneously employs multiple threads, through multiple connections, to initiate communication with the server computer, e.g., server 104. Each thread preferably employs a different protocol and requests the server computer to respond to the client computer using the protocol associated with that thread. For example, client computer 106 may, employing the autodetect mechanism, initiate five different threads, using respectively the TCP, UDP, one of HTTP and HTTP proxy, HTTP through port (multiplex) 80, and HTTP through port (multiplex) 8080 protocols to request server 104 to respond.

Upon receiving a request, server 104 responds with data using the same protocol as that associated with the thread on which the request arrives. If one or more protocols is blocked and fails to reach server 104 (e.g., by a firewall), no response employing the blocked protocol would of course be transmitted from server 104 to client computer 106. Further, some of the protocols transmitted from server 104 to client computer 106 may be blocked as well. Accordingly, client computer may receive only a subset of the responses sent from server 104.

In one embodiment, client computer 106 monitors the set of received responses. If the predefined "best" protocol is received, that protocol is then selected for communication by client computer 106. The predefined "best" protocol may be defined in advance by the user and/or the application program. If the predefined "best" protocol is, however, blocked (as the request is transmitted from the client computer or as the response is transmitted from the server, for example) the most advantageous protocol may simply be selected from the set of protocols received back by the client computer. In one embodiment, the selection may be made among the set of protocols received back by the client computer within a predefined time period after the requests are sent out in parallel.

The selection of the most advantageous protocol for communication among the protocols received by client computer 106 may be performed in accordance with some predefined priority. For example, in the real-time data rendering application, the UDP protocol may be preferred over TCP protocol, which may be in turned preferred over the HTTP protocol. This is because UDP protocol typically can handle a greater data transmission rate and may allow client computer 106 to exercise a greater degree of control over the transmission of data packets.

HTTP data, while popular nowadays for use in transmitting web pages, typically involves a higher number of overhead bits, making it less efficient relative to the UDP protocol for transmitting real-time data. As is known, the HTTP protocol is typically built on top of TCP. The underlaying TCP protocol typically handles the transmission and retransmission requests of individual data packets automatically. Accordingly, the HTTP protocol tends to reduce the degree of control client computer 106 has over the transmission of the data packets between server 104 and client computer 106. Of course other priority schemes may exist for different applications, or even for different real-time data rendering applications.

In one embodiment, as client computer 106 is installed and initiated for communication with server 104 for the first time, the autodetect mechanism is invoked to allow client computer 106 to send transmission requests in parallel (e.g., using different protocols over different connections) in the manner discussed earlier. After server 104 responds with data via multiple connections/protocols and the most advantageous protocol has been selected by client computer 106 for communication (in accordance with some predefined priority), the parameters associated with the selected protocol are then saved for future communication.

Once the most advantageous protocol is selected, the autodetect mechanism may be disabled, and future communication between client computer 106 and server 104 may proceed using the selected most advantageous protocol without further invocation of the autodetect mechanism. If the topology of computer network 100 changes and communication using the previously selected "most advantageous" protocol is no longer appropriate, the autodetect mechanism may be executed again to allow client computer 106 to ascertain a new "most advantageous" protocol for communication with server 104. In one embodiment, the user of client computer 106 may, if desired, initiate the autodetect mechanism at anytime in order to enable client computer 106 to update the "most advantageous" protocol for communication with server 104 (e.g., when the user of client computer 106 has reasons to suspect that the previously selected "most advantageous" protocol is no longer the most optimal protocol for communication).

Figure 2:
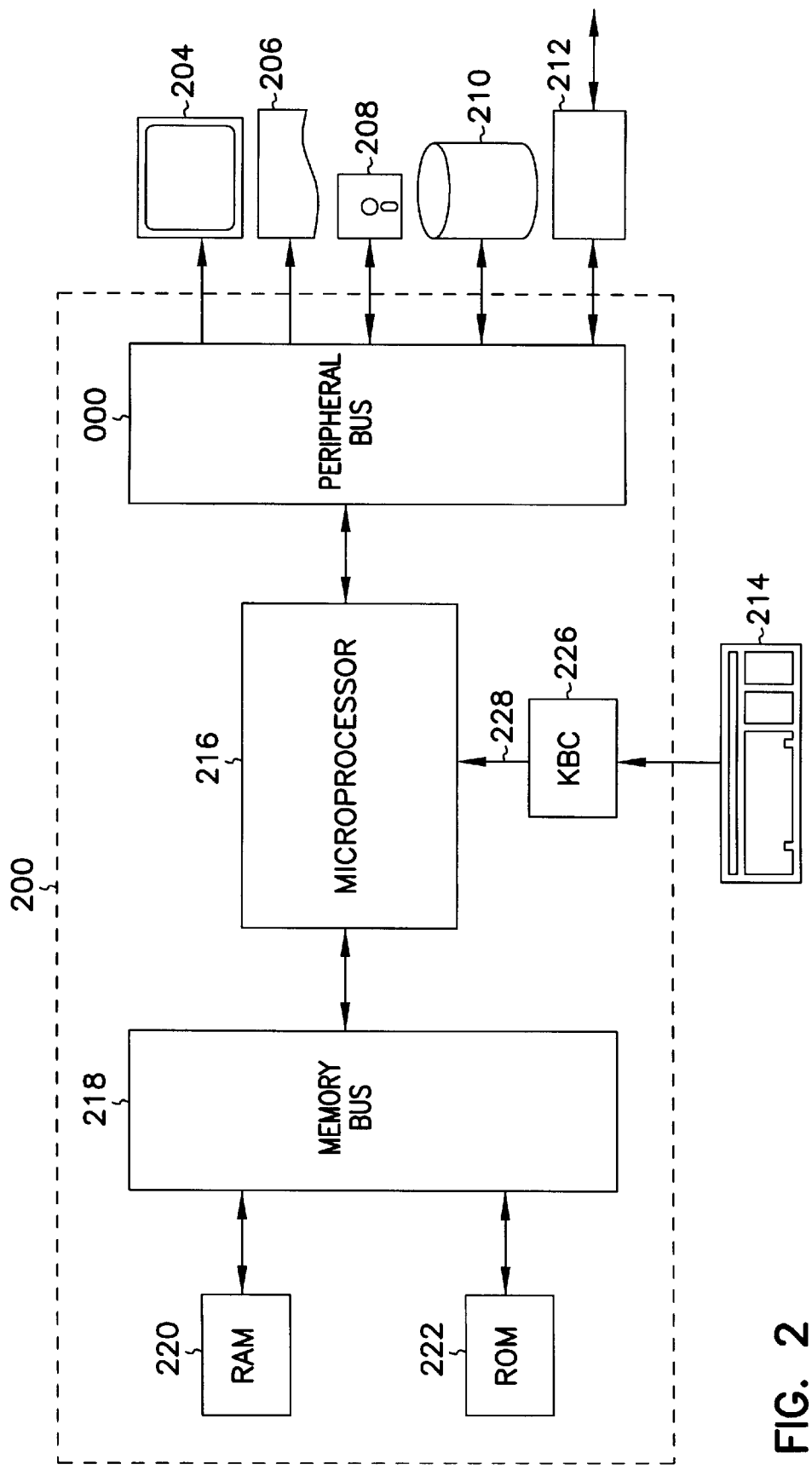
FIG. 2 is a block diagram of an exemplar computer system for carrying out the autodetect technique according to one embodiment of the invention.

The inventive autodetect mechanism may be implemented either in software or hardware, e.g., via an IC chip. If implemented in software, it may be carried out by any number of computers capable of functioning as a client computer in a computer network. FIG. 2 is a block diagram of an exemplar computer system 200 for carrying out the autodetect technique according to one embodiment of the invention. Computer system 200, or an analogous one, may be employed to implement either a client or a server of a computer network. The computer system 200 includes a digital computer 202, a display screen (or monitor) 204, a printer 206, a floppy disk drive 208, a hard disk drive 210, a network interface 212, and a keyboard 214. The digital computer 202 includes a microprocessor 216, a memory bus 218, random access memory (RAM) 220, read only memory (ROM) 222, a peripheral bus 224, and a keyboard controller 226. The digital computer 200 can be a personal computer (such as an Apple computer, e.g., an Apple Macintosh, an IBM personal computer, or one of the compatibles thereof), a workstation computer (such as a Sun Microsystems or Hewlett-Packard workstation), or some other type of computer.

The microprocessor 216 is a general purpose digital processor which controls the operation of the computer system 200. The microprocessor 216 can be a single-chip processor or can be implemented with multiple components. Using instructions retrieved from memory, the microprocessor 216 controls the reception and manipulation of input data and the output and display of data on output devices.

The memory bus 218 is used by the microprocessor 216 to access the RAM 220 and the ROM 222. The RAM 220 is used by the microprocessor 216 as a general storage area and as scratch-pad memory, and can also be used to store input data and processed data. The ROM 222 can be used to store instructions or program code followed by the microprocessor 216 as well as other data.

The peripheral bus 224 is used to access the input, output, and storage devices used by the digital computer 202. In the described embodiment, these devices include the display screen 204, the printer device 206, the floppy disk drive 208, the hard disk drive 210, and the network interface 212, which is employed to connect computer 200 to the network. The keyboard controller 226 is used to receive input from keyboard 214 and send decoded symbols for each pressed key to microprocessor 216 over bus 228.

The display screen 204 is an output device that displays images of data provided by the microprocessor 216 via the peripheral bus 224 or provided by other components in the computer system 200. The printer device 206 when operating as a printer provides an image on a sheet of paper or a similar surface. Other output devices such as a plotter, typesetter, etc. can be used in place of, or in addition to, the printer device 206.

The floppy disk drive 208 and the hard disk drive 210 can be used to store various types of data. The floppy disk drive 208 facilitates transporting such data to other computer systems, and hard disk drive 210 permits fast access to large amounts of stored data.

The microprocessor 216 together with an operating system operate to execute computer code and produce and use data. The computer code and data may reside on the RAM 220, the ROM 222, the hard disk drive 220, or even on another computer on the network. The computer code and data could also reside on a removable program medium and loaded or installed onto the computer system 200 when needed. Removable program mediums include, for example, CD-ROM, PC-CARD, floppy disk and magnetic tape.

The network interface circuit 212 is used to send and receive data over a network connected to other computer systems. An interface card or similar device and appropriate software implemented by the microprocessor 216 can be used to connect the computer system 200 to an existing network and transfer data according to standard protocols.

The keyboard 214 is used by a user to input commands and other instructions to the computer system 200. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable code can also be distributed over a network coupled computer systems so that the computer readable code is stored and executed in a distributed fashion.

Figure 3:
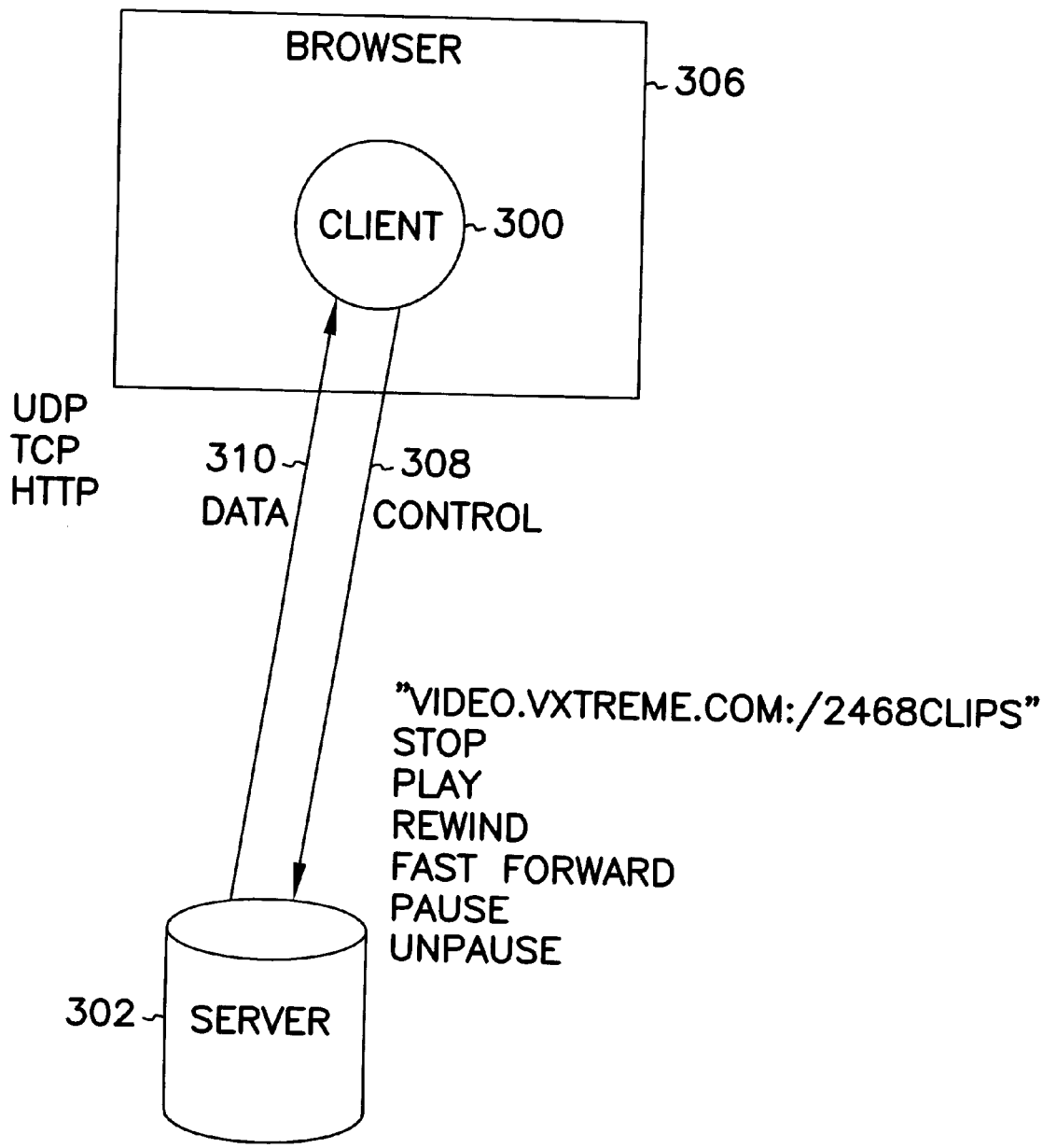
FIG. 3 illustrates, in accordance with one embodiment, the control and data connections between a client application and a server computer when no firewall is provided in the network.

FIGS. 3–6 below illustrate, to facilitate discussion, some possible arrangements for the transmission and receipt of data in a computer network. The arrangements differ depend on which protocol is employed and the configuration of the network itself. FIG. 3 illustrates, in accordance with one embodiment, the control and data connections between a client application 300 and server 302 when no firewall is provided in the network.

Client application 300 may represent, for example, the executable codes for executing a real-time data rendering program such as the Web Theater Client 2.0, available from VXtreme, Inc. of Sunnyvale, Calif. In the example of FIG. 3, client application 300 includes the inventive autodetect mechanism and may represent a plug-in software module that may be installed onto a browser 306. Browser 306 may represent, for example, the application program which the user of the client computer employs to navigate the network. By way of example, browser 306 may represent one of the popular Internet browser programs, such as Netscape™ by Netscape Communications Inc. of Mountain View, Calif. or Microsoft Explorer by Microsoft Corporation of Redmond, Wash.

When the autodetect mechanism of client application 300 is executed in browser 306 (e.g., during the set up of client application 300), client application 300 sends a control request over control connection 308 to server 302. Although multiple control requests are typically sent in parallel over multiple control connections using different protocols as discussed earlier, only one control request is depicted in FIG. 3 to facilitate ease of illustration.

The protocol employed to send the control request over control connection 308 may represent, for example, TCP, or HTTP. If UDP protocol is requested from the server, the request from the client may be sent via the control connection using for example the TCP protocol. Initially, each control request from client application 300 may include, for example, the server name that identifies server 302, the port through which control connection may be established, and the name of the video stream requested by client application 300. Server 302 then responds with data via data connection 310.

In FIG. 3, it is assumed that no proxies and/or firewalls exist. Accordingly, server 302 responds using the same protocol as that employed in the request. If the request employs TCP, however, server 302 may attempt to respond using either UDP or TCP data connections (depending on the specifics of the request). The response is sent to client application via data connection 310. If the protocol received by the client application is subsequently selected to be the "most advantageous" protocol, subsequent communication between client application 300 and server 302 may take place via control connection 308 and data connection 310. Subsequent control requests sent by client application 300 via control connection 308 may include, for example, stop, play, fast forward, rewind, pause, unpause, and the like. These control requests may be utilized by server 302 to control the delivery of the data stream from server 302 to client application 300 via data connection 310.

It should be noted that although only one control connection and one data connection is shown in FIG. 3 to simplify illustration, multiple control and data connections utilizing the same protocol may exist during a data rendering session. Multiple control and data connections may be required to handle the multiple data streams (e.g., audio, video, annotation) that may be needed in a particular data rendering session. If desired, multiple clients applications 300 may be installed within browser 306, e.g., to simultaneously render multiple video clips, each with its own sound and annotations.

Figure 4:
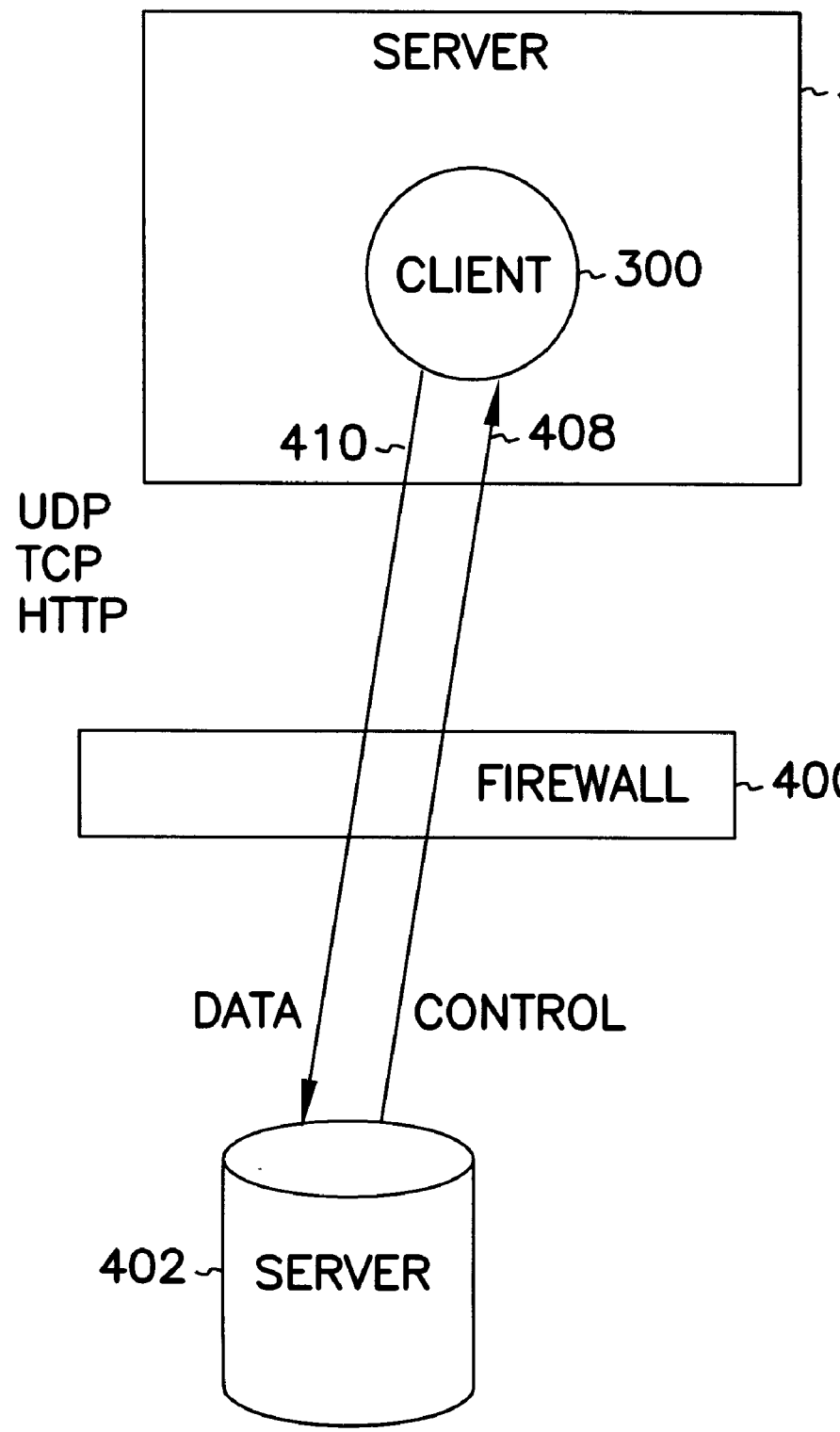
FIG. 4 illustrates another network arrangement wherein control and data connections are established through a firewall.

FIG. 4 illustrates another network arrangement wherein control and data connections are established through a firewall. As mentioned earlier, a firewall may have policies that restrict or prohibit the traversal of certain types of data and/or protocols. In FIG. 4, a firewall 400 is disposed between client application 300 and server 402. Upon execution, client application 300 sends control request using a given protocol via firewall 400 to server 402. Server 402 then responds with data via data connection 410, again via firewall 400.

If the data and/or protocol can be received by the client computer through firewall 400, client application 300 may then receive data from server 402 (through data connection 408) in the same protocol used in the request. As before, if the request employs the TCP protocol, the server may respond with data connections for either TCP or UDP protocol (depending on the specifics of the request). Protocols that may traverse a firewall may include one or more of the following: UDP, TCP, and HTTP.

Figure 5A:
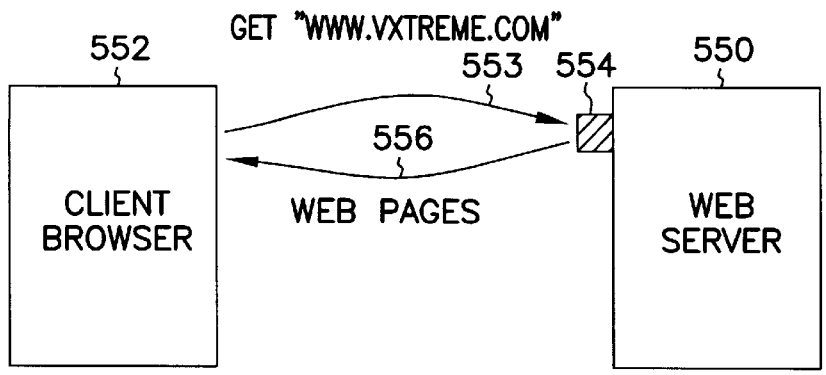
FIGS. 5A–B illustrates another network arrangement wherein media control commands and media data may be communicated between a client computer and a server computer using the HTTP protocol.

In accordance with one aspect of the present invention, the HTTP protocol may be employed to send/receive media data (video, audio, annotation, or the like) between the client and the server. FIG. 5A is a prior art drawing illustrating how a client browser may communicate with a web server using a port designated for communication. In FIG. 5, there is shown a web server 550, representing the software module for serving web pages to a browser application 552. Web server 550 may be any of the commercially available web servers that are available from, for example, Netscape Communications Inc. of Mountain View, Calif. or Microsoft Corporation of Redmond, Wash. Browser application 552 represents for example the Netscape browser from the aforementioned Netscape Communications, Inc., or similarly suitable browser applications.

Through browser application 552, the user may, for example, obtain web pages pertaining to a particular entity by sending an HTTP request (e.g., GET) containing the URL (uniform resource locator) that identifies the web page file. The request sent via control connection 553 may arrive at web server 550 through the HTTP port 554. HTTP port 554 may represent any port through which HTTP communication is enabled. HTTP port 554 may also represent the default port for communicating web pages with client browsers. The HTTP default port may represent, for example, either port 80 or port 8080 on web server 550. As is known, one or both of these ports on web server 550 may be available for web page communication even if there are firewalls disposed between the web server 550 and client browser application 552, which otherwise block all HTTP traffic in other ports. Using the furnished URL, web server 550 may then obtain the desired web page(s) for sending to client browser application 552 via data connection 556.

The invention, in one embodiment, involves employing the HTTP protocol to communicate media commands from a browser application or browser plug-in to the server. Media commands are, for example, PLAY, STOP, REWIND, FAST FORWARD, and PAUSE. The server computer may represent, for example, a web server. The server computer may also represent a video server for streaming video to the client computer. Through the use of the HTTP protocol the client computer may successfully send media control requests and receive media data through any HTTP port. If the default HTTP port, e.g., port 80 or 8080, is specified, the client may successfully send media control requests and receive media data even if there exists a firewall or an HTTP Proxy disposed in between the server computer and the client computer, which otherwise blocks all other traffic that does not use the HTTP protocol. For example, these firewalls or HTTP Proxies do not allow regular TCP or UDP packets to go through.

As is well known to those skilled, the HTTP protocol, as specified by for example the Internet Request For Comments RFC 1945 (T. Berners-Lee et al.), typically defines only three types of requests to be sent from the client computer to the server, namely GET, POST, and HEAD. The POST command, for instance, is specified in RFC 1945 to be composed of a Request-Line, one or more Headers and Entity-Body. To send media commands like PLAY, REWIND, etc., the invention in one embodiment sends the media command as part of the Entity-Body of the HTTP POST command. The media command can be in any format or protocol, and can be, for instance, in the same format as that employed when firewalls are not a concern and plain TCP protocol can be used. This format can be, for example, RTSP (Real Time Streaming Protocol).

When a server gets an HTTP request, it answers the client with an HTTP Response. Responses are typically composed of a Status-Line, one or more headers, and an Entity-Body. In one embodiment of this invention, the response to the media commands is sent as the Entity-Body of the response to the original HTTP request that carried the media command.

Figure 5B:
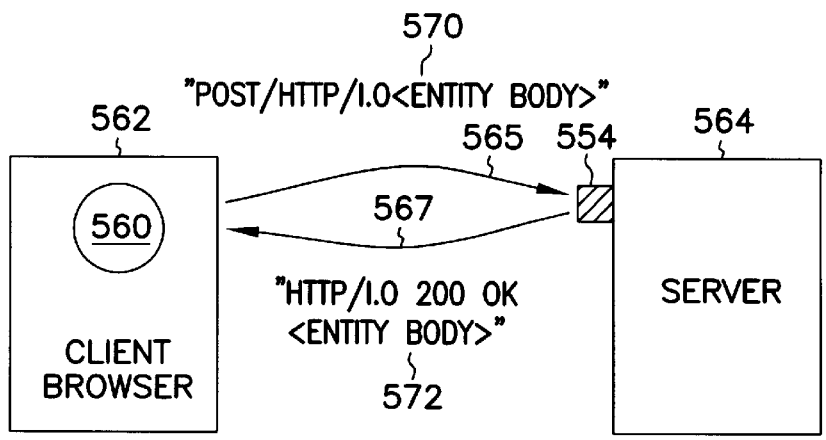

FIG. 5B illustrates this use of HTTP for sending arbitrary media commands. In FIG. 5B, the plug-in application 560 within client browser application 562 may attempt to receive media data (e.g., video, audio, annotation, or the like) by first sending an HTTP request to server 564 via control connection 565. For example, a REWIND command could be sent from the client 560 to the server 564 as an HTTP packet 570 of the form: "POST/HTTP/1.0<Entity-Body containing rewind command in any suitable media protocol>". The server can answer to this request with an HTTP response 572 of the form: "HTTP/1.0 200ok<Entity-Body containing rewind response in any suitable media protocol>".

The HTTP protocol can be also used to send media data across firewalls. The client can send a GET request to the video server, and the video server can then send the video data as the Entity-Body of the HTTP response to this GET request.

Some firewalls may be restrictive with respect to HTTP data and may permit HTTP packets to traverse only on a certain port, e.g., port 80 and/or port 8080. FIG. 5C illustrates one such situation. In this case, the control and data communications for the various data stream, e.g., audio, video, and/or annotation associated with different rendering sessions (and different clients) may be multiplexed using conventional multiplexer code and/or circuit 506 at client application 300 prior to being sent via port 502 (which may represent, for example, HTTP port 80 or HTTP port 8080). The inventive combined use of the HTTP protocol and of the multiplexer for transmitting media control and data is referred to as the HTTP multiplex protocol, and can be used to send this data across firewalls that only allow HTTP traffic on specific ports, e.g., port 80 or 8080.

At server 402, representing, for example, server 104 of FIG. 1, conventional demultiplexer code and/or circuit 508 may be employed to decode the received data packets to identify which stream the control request is associated with. Likewise, data sent from server 402 to client application 300 may be multiplexed in advance at server 402 using for example conventional multiplexer code and/or circuit 510. The multiplexed data is then sent via port 502. At client application 300, the multiplexed data may be decoded via conventional demultiplexer code and/or circuit 512 to identify which stream the received data packets is associated with (audio, video, or annotation).

Multiplexing and demultiplexing at the client and/or server may be facilitated for example by the use of the Request-URL part of the Request-Line of HTTP requests. As mentioned above, the structure of HTTP requests is described in RFC 1945. The Request-URL may, for example, identify the stream associated with the data and/or control request being transmitted. In one embodiment, the additional information in the Request-URL in the HTTP header may be as small as one or a few bits added to the HTTP request sent from client application 300 to server 402.

Figure 5D:
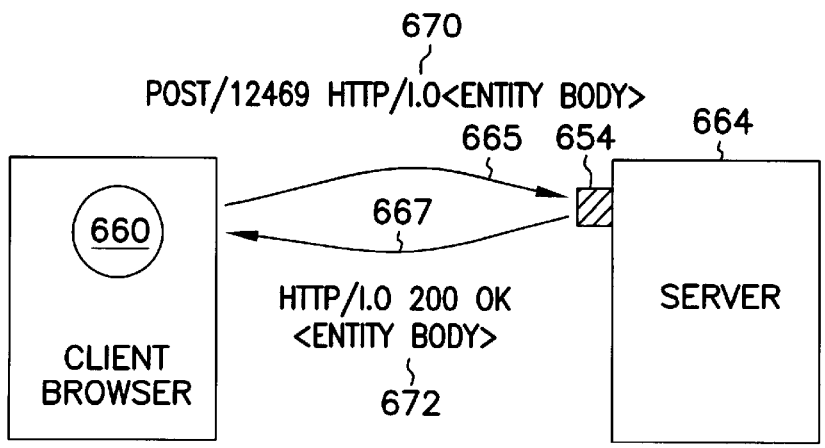
FIGS. 5C–D illustrate another network arrangement wherein multiple HTTP control and data connections are multiplexed through a single HTTP port.
Figure 5C:
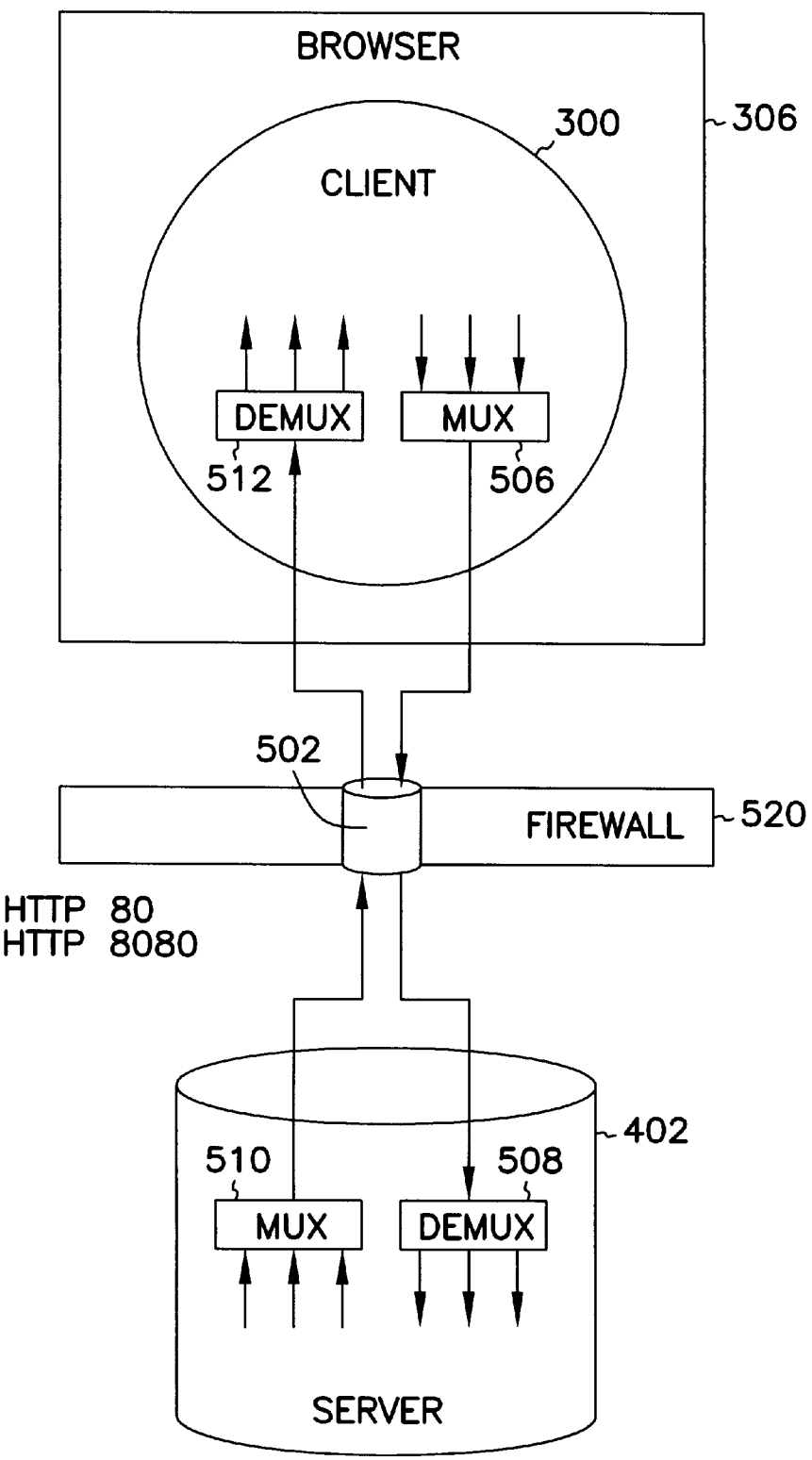

To further facilitate discussion of the inventive HTTP multiplexing technique, reference may now be made to FIG. 5D. In FIG. 5D, the plug-in application 660 within client plug-in application 660 may attempt to receive media data (e.g., video, audio, annotation, or the like) by first sending a control request 670 to server 664 via control connection 665. The control request is an HTTP request, which arrives at the HTTP default port 654 on server 664. As mentioned earlier, the default HTTP port may be either port 80 or port 8080 in one embodiment.

In one example, the control request 670 from client plug-in 660 takes the form of a command to "POST/12469 HTTP/1.0<Entity-Body>" which indicates to the server (through the designation 12469 as the Request-URL) that this is a control connection. The Entity-Body contains, as described above, binary data that informs the video server that the client plug-in 660 wants to display a certain video or audio clip. Software codes within server 664 may be employed to assign a unique ID to this particular request from this particular client.

For discussion sake, assume that server 664 associates unique ID 35,122 with a video data connection between itself and client plug-in application 660, and unique ID 29,999 with an audio data connection between itself and client plug-in application. The unique ID is then communicated as message 672 from server 664 to client plug-in application 660, again through the aforementioned HTTP default port using data connection 667. The Entity-Body of message 672 contains, among other things and as depicted in detail 673, the audio and/or video session ID. Note that the unique ID is unique to each data connection (e.g., each of the audio, video, and annotation connections) of each client plug-in application (since there may be multiple client plug-in applications attempting to communicate through the same port).

Once the connection is established, the same unique ID number is employed by the client to issue HTTP control requests to server 664. By way of example, client plug-in application 660 may issue a command "GET /35,122 HTTP/ 1.0" or "POST /35,122 HTTP/1.0<Entity-Body containing binary data with the REWIND media command>" to request a video file or to rewind on the video file. Although the rewind command is used in FIGS. 5A–5D to facilitate ease of discussion, other media commands, e.g., fast forward, pause, real-time play, live-play, or the like, may of course be sent in the Entity-Body. Note that the unique ID is employed in place of or in addition to the Request-URL to qualify the Request-URL.

Once the command is received by server 664, the unique ID number (e.g. 35,122) may be employed by the server to demultiplex the command to associate the command with a particular client and data file. This unique ID number can also attach to the HTTP header of HTTP responses sent from server 664 to client plug-in application 660, through the same HTTP default port 654 on server 664, to permit client plug-in application 660 to ascertain whether an HTTP data packet is associated with a given data stream.

Advantageously, the invention permits media control commands and media data to be communicated between the client computer and the server computer via the default HTTP port, e.g., port 80 or 8080 in one embodiment, even if HTTP packets are otherwise blocked by a firewall disposed between the client computer and the server computer. The association of each control connection and data connection to each client with a unique ID advantageously permits multiple control and data connections (from one or more clients) to be established through the same default HTTP port on the server, advantageously bypassing the firewall. Since both the server and the client have the demultiplexer code and/or circuit that resolve a particular unique ID into a particular data stream, multiplexed data communication is advantageously facilitated thereby.

Figure 6:
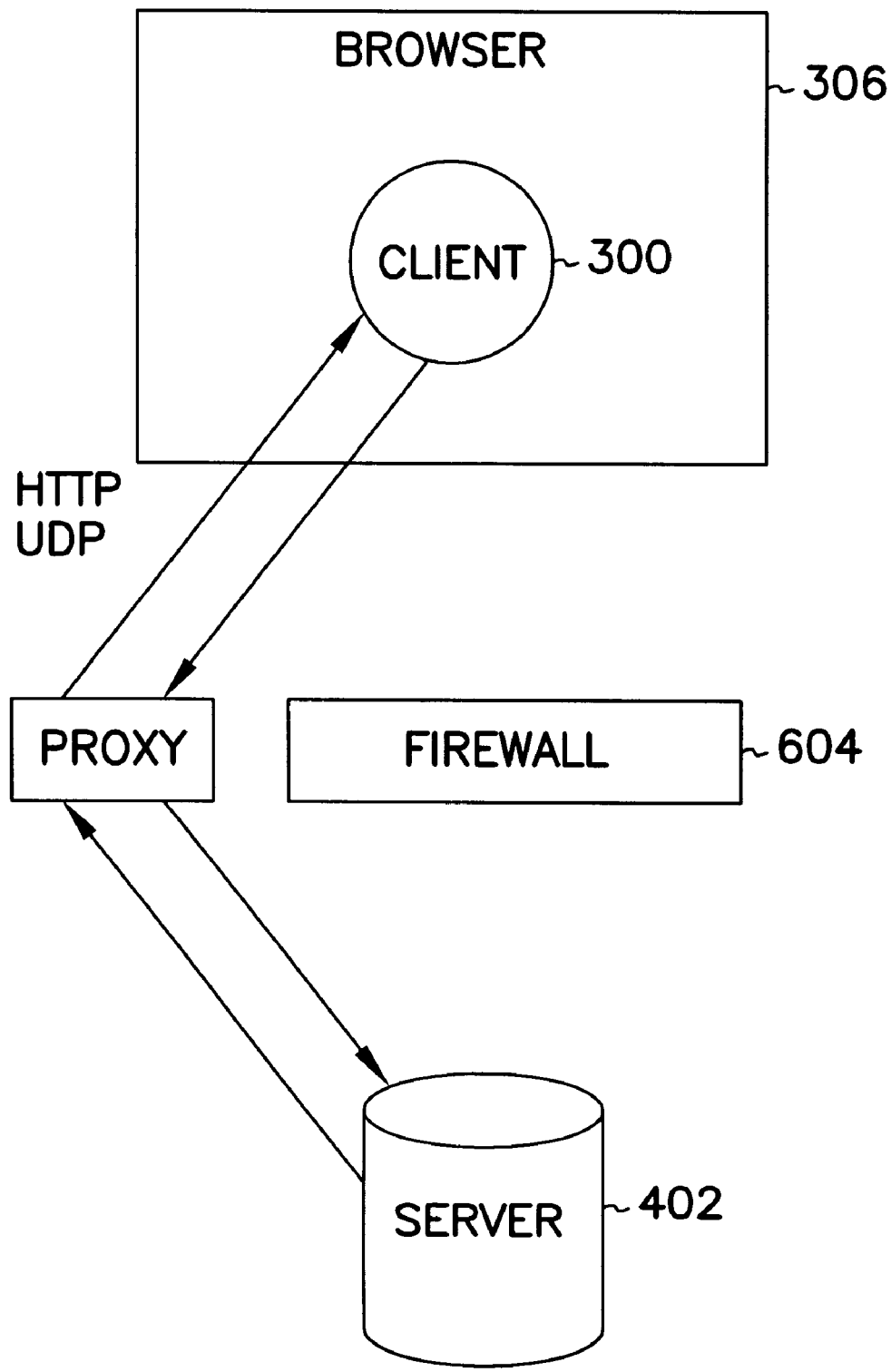
FIG. 6 illustrates another network arrangement wherein control and data connections are transmitted between the client application and the server computer via a proxy.

In some networks, it may not be possible to traverse the firewall due to stringent firewall policies. As mentioned earlier, it may be possible in these situations to allow the client application to communicate with a server using a proxy. FIG. 6 illustrates this situation wherein client application 300 employs proxy 602 to communicate with server 402. The use of proxy 602 may be necessary since client application 300 may employ a protocol which is strictly prohibited by firewall 604. The identity of proxy 602 may be found in browser program 306, e.g., Netscape as it employs the proxy to download its web pages, or may be configured by the user himself. Typical protocols that may employ a proxy for communication, e.g., proxy 602, includes HTTP and UDP.

In accordance with one embodiment of the present invention, the multiple protocols that may be employed for communication between a server computer and a client computer are tried in parallel during autodetect. In other words, the connections depicted in FIGS. 3, 4, 5C, and 6 may be attempted simultaneously and in parallel over different control connections by the client computer. Via these control connections, the server is requested to respond with various protocols.

If the predefined "best" protocol (predetermined in accordance with some predefined protocol priority) is received by the client application from the server, autodetect may, in one embodiment, end immediately and the "best" protocol is selected for immediate communication. In one real-time data rendering application, UDP is considered the "best" protocol, and the receipt of UDP data by the client may trigger the termination of the autodetect.

If the "best" protocol has not been received after a predefined time period, the most advantageous protocol (in terms of for example data transfer rate and/or transmission control) is selected among the set of protocols received by the client. The selected protocol may then be employed for communication between the client and the server.

Figure 7:
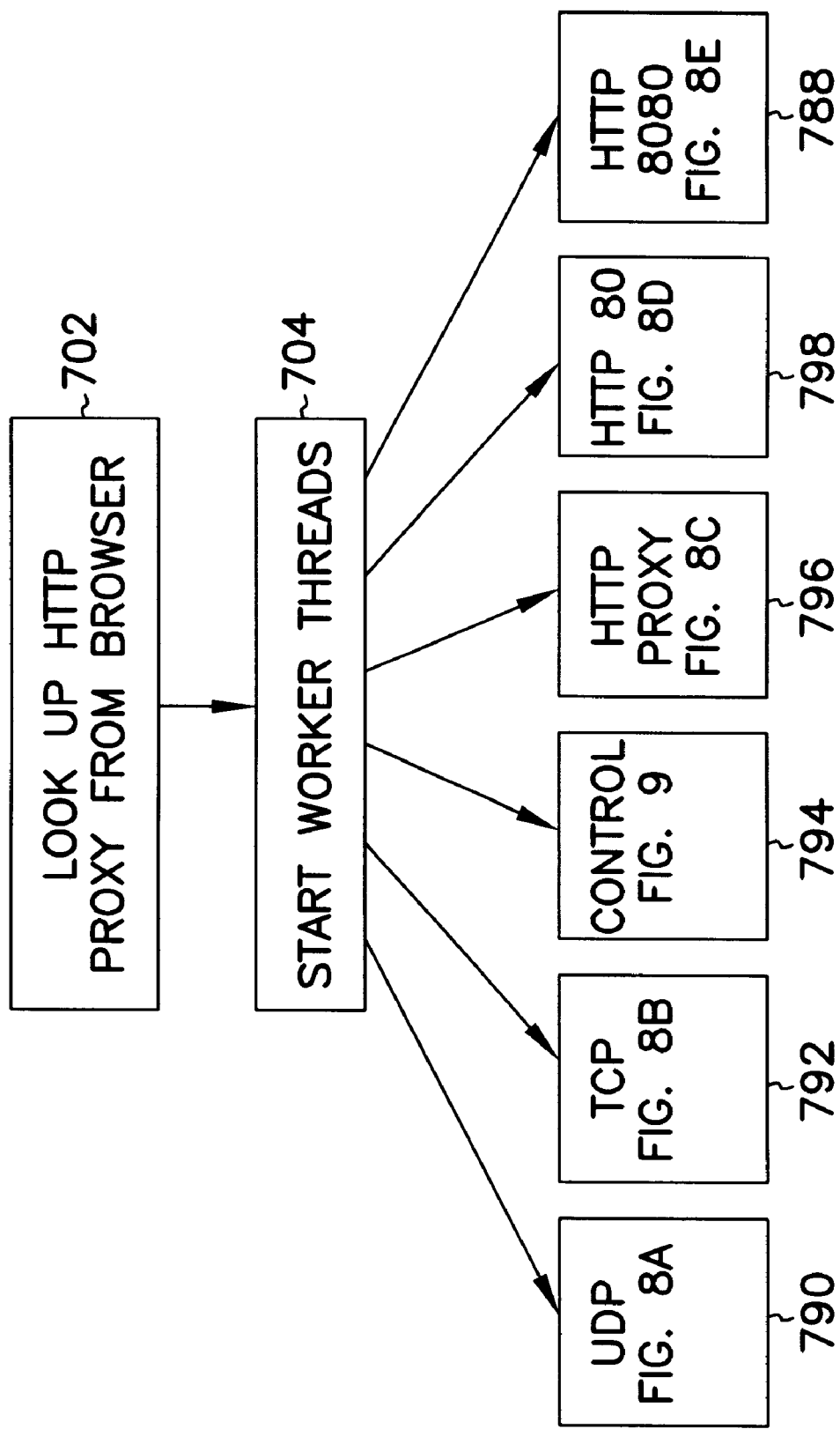
FIG. 7 depicts, in accordance with one embodiment of the present invention, a simplified flowchart illustrating the steps of the inventive autodetect technique.

FIG. 7 depicts, in accordance with one embodiment of the present invention, a simplified flowchart illustrating the steps of the inventive autodetect technique. In FIG. 7, the client application starts (in step 702) by looking up the HTTP proxy, if there is any, from the browser. As stated earlier, the client computer may have received a web page from the browser, which implies that the HTTP protocol may have been employed by the browser program for communication. If a HTTP proxy is required, the name and location of the HTTP proxy is likely known to the browser, and this knowledge may be subsequently employed by the client to at least enable communication with the server using the HTTP proxy protocol, i.e., if a more advantageous protocol cannot be ascertained after autodetect.

In step 704, the client begins the autodetect sequence by starting in parallel the control thread 794, along with five protocol threads 790, 792, 796, 798, and 788. As the term is used herein, parallel refers to both the situation wherein the multiple protocol threads are sent parallelly starting at substantially the same time (having substantially similar starting time), and the situation wherein the multiple protocol threads simultaneously execute (executing at the same time), irrespective when each protocol thread is initiated. In the latter case, the multiple threads may have, for example, staggered start time and the initiation of one thread may not depend on the termination of another thread.

Control tread 794 represents the thread for selecting the most advantageous protocol for communication. The other protocol threads 790, 792, 796, 798, and 788 represent threads for initiating in parallel communication using the various protocols, e.g., UDP, TCP, HTTP proxy, HTTP through port 80 (HTTP 80), and HTTP through port 8080 (HTTP 8080). Although only five protocol threads are shown, any number of protocol threads may be initiated by the client, using any conventional and/or suitable protocols. The steps associated with each of threads 794, 790, 792, 796, 798, and 788 are discussed herein in connection with FIGS. 8A–8E and 9.

Figure 8A:
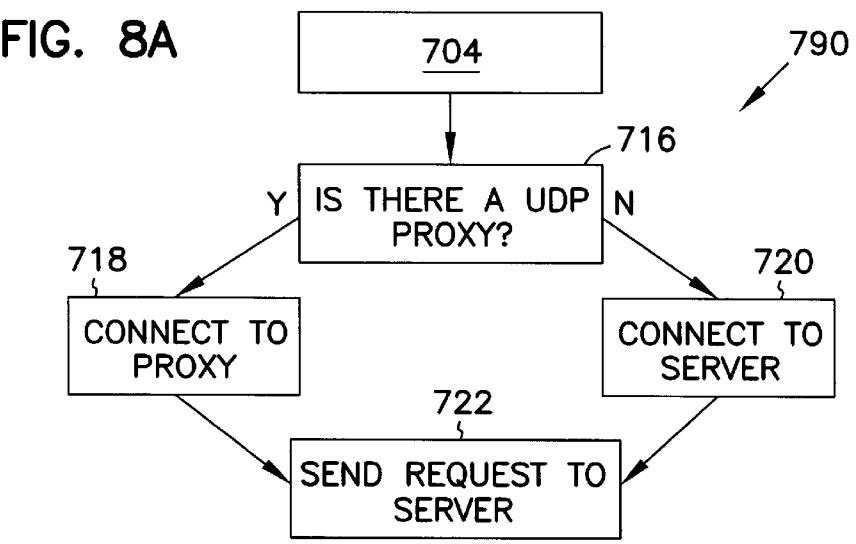
FIG. 8A depicts, in accordance with one aspect of the present invention, the steps involved in executing the UDP protocol thread of FIG. 7.

In FIG. 8A, the UDP protocol thread is executed. The client inquires in step 716 whether there requires a UDP proxy. If the UDP proxy is required, the user may obtain the name of the UDP proxy from, for example, the system administrator in order to use the UDP proxy to facilitate communication to the proxy (in step 718). If no UDP proxy is required, the client may directly connect to the server (in step 720). Thereafter, the client may begin sending a data request (i.e., a control request) to the server in step 722 using the UDP protocol (either through the proxy if a proxy is involved or directly to the server if no proxy is required).

Figure 8B:
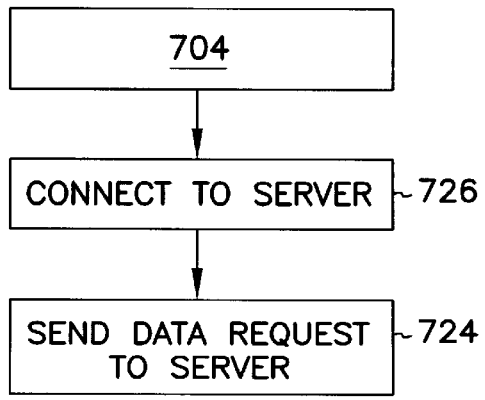
FIG. 8B depicts, in accordance with one aspect of the present invention, the steps involved in executing the TCP protocol thread of FIG. 7.

In FIG. 8B, the TCP protocol thread is executed. If TCP protocol is employed, the client typically directly connects to the server (in step 726). Thereafter, the client may begin sending a data request (i.e., a control request) to the server using the TCP protocol (step 724).

Figure 8C:
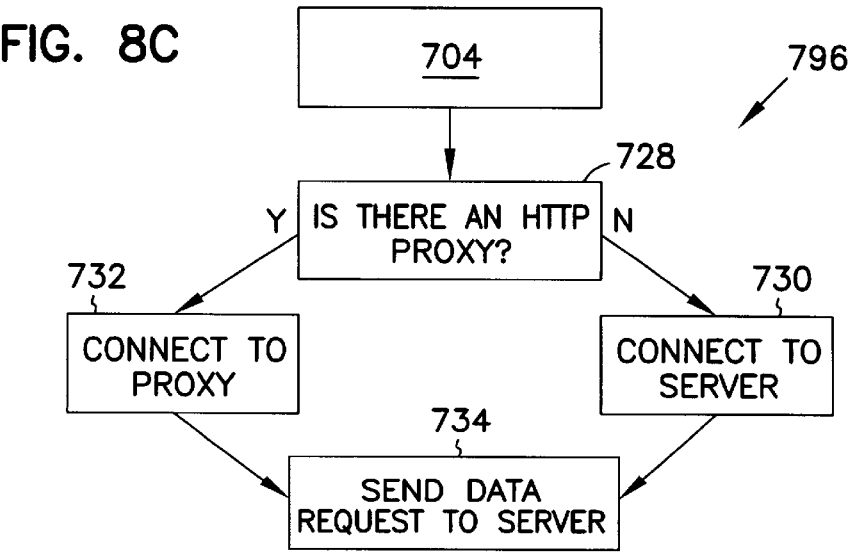
FIG. 8C depicts, in accordance with one aspect of the present invention, the steps involved in executing the HTTP protocol thread of FIG. 7.

In FIG. 8C, the HTTP protocol thread is executed. The client inquires in step 716 whether there requires a HTTP proxy. If the HTTP proxy is required, the user may obtain the name of the HTTP proxy from, for example, the browser since, as discussed earlier, the data pertaining to the proxy may be kept by the browser. Alternatively, the user may obtain data pertaining to the HTTP proxy from the system administrator in order to use the HTTP proxy to facilitate communication to the server (in step 732).

If no HTTP proxy is required, the client may directly connect to the server (in step 730). Thereafter, the client may begin sending a data request (i.e., a control request) to the server in step 734 using the HTTP protocol (either through the proxy if a proxy is involved or directly to the server if no proxy is required).

Figure 8D:
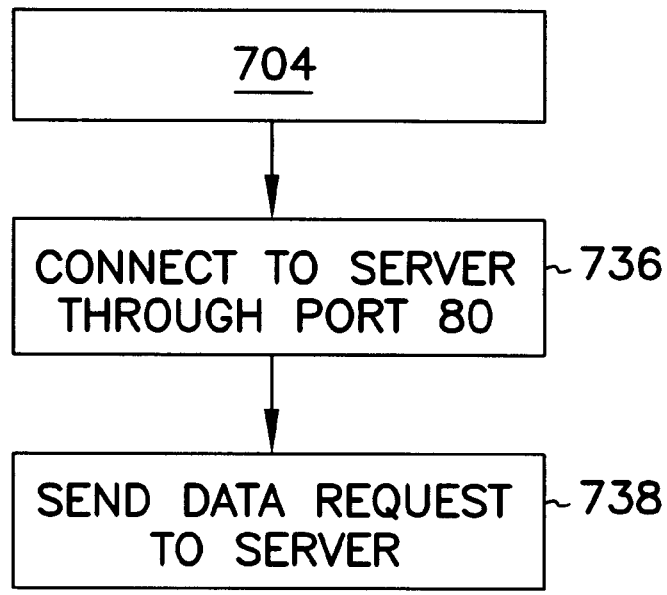
FIG. 8D depicts, in accordance with one aspect of the present invention, the steps involved in executing the HTTP 80 protocol thread of FIG. 7.

In FIG. 8D, the HTTP 80 protocol thread is executed. If HTTP 80 protocol is employed, HTTP data may be exchanged but only through port 80, which may be for example the port on the client computer through which communication with the network is permitted. Through port 80, the client typically directly connects to the server (in step 736). Thereafter, the client may begin sending a data request (i.e., a control request) to the server (step 738) using the HTTP 80 protocol.

Figure 8E:
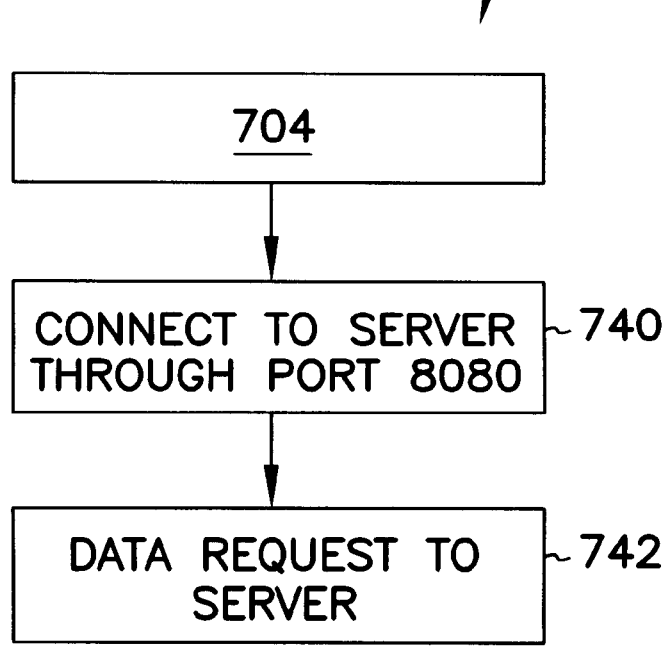
FIG. 8E depicts, in accordance with one aspect of the present invention, the steps involved in executing the HTTP 8080 protocol thread of FIG. 7.

In FIG. 8E, the HTTP 8080 protocol thread is executed. If HTTP 8080 protocol is employed, HTTP data may be exchanged but only through port 8080, which may be the port on the client computer for communicating with the network. Through port 8080, the client typically directly connects to the server (in step 740). Thereafter, the client may begin sending a data request (i.e., a control request) to the server (step 742) using the HTTP 8080 protocol. The multiplexing and demultiplexing techniques that may be employed for communication through port 8080, as well as port 80 of FIG. 8D, have been discussed earlier and are not repeated here for brevity sake.

Figure 9:
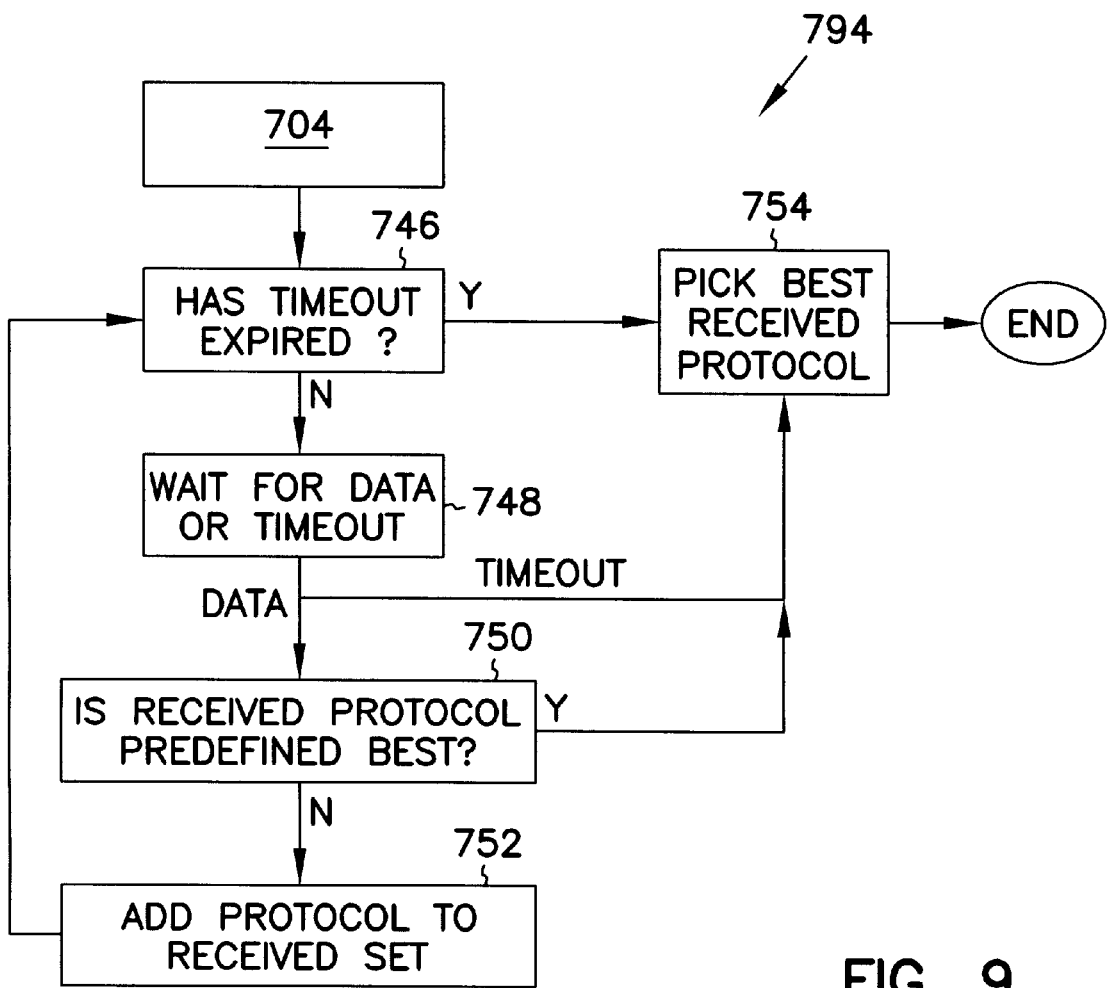
FIG. 9 illustrates, in accordance with one embodiment of the present invention, the steps involved in executing the control thread of FIG. 7.

FIG. 9 illustrates, in accordance with one embodiment of the present invention, control thread 794 of FIG. 7. It should be emphasized that FIG. 7 is but one way of implementing the control thread; other techniques of implementing the control thread to facilitate autodetect should be apparent to those skilled in the art in view of this disclosure. In step 746, the thread determines whether the predefined timeout period has expired. The predefined timeout period may be any predefined duration (such as 7 seconds for example) from the time the data request is sent out to the server (e.g., step 722 of FIG. 8A). In one embodiment, each protocol thread has its own timeout period whose expiration occurs at the expiration of a predefined duration after the data request using that protocol has been sent out. When all the timeout periods associated with all the protocols have been accounted for, the timeout period for the autodetect technique is deemed expired.

If the timeout has occured, the thread moves to step 754 wherein the most advantageous protocol among the set of protocols received back from the server is selected for communication. As mentioned, the selection of the most advantageous protocol may be performed in accordance with some predefined priority scheme, and data regarding the selected protocol may be saved for future communication sessions between this server and this client.

If no timeout has occurred, the thread proceeds to step 748 to wait for either data from the server or the expiration of the timeout period. If timeout occurs, the thread moves to step 754, which has been discussed earlier. If data is received from the server, the thread moves to step 750 to ascertain whether the protocol associated with the data received from the server is the predefined "best" protocol, e.g., in accordance with the predefined priority.

If the predefined "best" protocol (e.g., UDP in some real-time data rendering applications) is received, the thread preferably moves to step 754 to terminate the autodetect and to immediately begin using this protocol for data communication instead of waiting of the timeout expiration. Advantageously, the duration of the autodetect sequence may be substantially shorter than the predefined timeout period. In this manner, rapid autodetect of the most suitable protocol and rapid establishment of communication are advantageously facilitated.

If the predefined "best" protocol is not received in step 750, the thread proceeds to step 752 to add the received protocol to the received set. This received protocol set represents the set of protocols from which the "most advantageous" (relatively speaking) protocol is selected. The most advantageous protocol is ascertained relative to other protocols in the received protocol set irrespective whether it is the predefined "best" protocol in accordance with the predefined priority. As an example of a predefined protocol priority, UDP may be deemed to be best (i.e., the predefined best), followed by TCP, HTTP, then HTTP 80 and HTTP 8080 (the last two may be equal in priority). As mentioned earlier, the most advantageous protocol is selected from the received protocol set preferably upon the expiration of the predefined timeout period.

From step 752, the thread returns to step 746 to test whether the timeout period has expired. If not, the thread continues along the steps discussed earlier.

Note that since the invention attempts to establish communication between the client application and the server computer in parallel, the time lag between the time the autodetect mechanism begins to execute and the time when the most advantageous protocol is determined is minimal. If communication attempts have been tried in serial, for example, the user would suffer the delay associated with each protocol thread in series, thereby disadvantageously lengthening the time period between communication attempt and successful establishment of communication.

The saving in time is even more dramatic in the event the network is congested or damaged. In some networks, it may take anywhere from 30 to 90 seconds before the client application realizes that an attempt to connect to the server (e.g., step 720, 726, 730, 736, or 740) has failed. If each protocol is tried in series, as is done in one embodiment, the delay may, in some cases, reach minutes before the user realizes that the network is unusable and attempts should be made at a later time.

By attempting to establish communication via the multiple protocols in parallel, network-related delays are suffered in parallel. Accordingly, the user does not have to wait for multiple attempts and failures before being able to ascertain that the network is unusable and an attempt to establish communication should be made at a later time. In one embodiment, once the user realizes that all parallel attempts to connect with the network and/or the proxies have failed, there is no need to make the user wait until the expiration of the timeout periods of each thread. In accordance with this embodiment, the user is advised to try again as soon as it is realized that parallel attempts to connect with the server have all failed. In this manner, less of the user's time is needed to establish optimal communication with a network.

While this invention has been described in terms of several preferred embodiments, there are alterations, permutations, and equivalents which fall within the scope of this invention. For example, although the invention has been described with reference with sending out protocol threads in parallel, the automatic protocol detection technique also applies when the protocol threads are sent serially. In this case, while it may take longer to select the most advantageous protocol for selection, the automatic protocol detection technique accomplishes the task without requiring any sophisticated technical knowledge on the part of the user of the client computer. The duration of the autodetect technique, even when serial autodetect is employed, may be shortened by trying the protocols in order of their desirability and ignoring less desirable protocols once a more desirable protocol is obtained. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer network, a method for automatically detecting a most advantageous protocol for communication by a client computer, said client computer being configured to be coupled to a server computer via a computer network, the method comprising:

sending, from said client computer to said server computer, a plurality of data requests substantially in parallel, each of said data requests employing a different protocol and a different connection, said data requests being configured to solicit, responsive to said data requests, a set of responses from said server computer, each of said responses employing a protocol associated with a respective one of said data requests;

receiving at said client computer at least a subset of said responses; monitoring said subset of said responses as each response is received from said server computer to select said most advantageous protocol from protocols associated with said subset of said responses, wherein said most advantageous protocol is determined based on a predefined protocol priority that designates a predefined best protocol; and in response to expiration of a timeout period without receiving a response employed by the predefined best protocol, selecting the most advantageous protocol from the protocols employed by the responses received at the client computer, the selection based at least in part on at least one of a data transfer rate and transmission control characteristics, said timeout period being measured from a transmitting time of a data request.

2. The method of claim 1 wherein said plurality of data requests are sent substantially at the same time.

3. The method of claim 1 wherein said plurality of data requests execute concurrently.

4. The method of claim 1 wherein said client computer, upon receiving a response employing said predefined best protocol, immediately designates said predefined best protocol as said most advantageous protocol.

5. The method of claim 1 wherein at least one data request is sent using a multiplexed HTTP protocol.

6. The method of claim 1 wherein said client computer is configured and arranged to execute an application for rendering real-time data as said real-time data is received from said server computer.

7. The method of claim 1 wherein said computer network comprises the Internet and said predefined best protocol is UDP.

8. The method of claim 7 wherein said real-time data represents one of a video data stream, an audio data stream, and an annotation data stream.

9. In a computer network, a method for automatically detecting a most advantageous protocol for communication by a client computer, said client computer being configured to be coupled to a server computer via a computer network, the method comprising:

sending, from said client computer to said server computer, a plurality of data requests substantially in parallel, each of said data requests employing a different protocol and a different connection;

receiving at least a subset of said data requests at said server computer;

sending a set of responses from said server computer to said client computer, said set of responses being responsive to said subset of said data requests, each of said responses employing a protocol associated with a respective one of said subset of said data requests;

receiving at said client computer at least a subset of said responses; and selecting, for said communication between said client computer and said server computer, said most advantageous protocol from protocols associated with said subset of said responses, wherein said most advantageous protocol is determined based on a predefined protocol priority that designates a predefined best protocol if a response employing the predefined best protocol is received at the client computer, and wherein, if a timeout period expires without the client computer receiving a response employing the predefined best protocol, the most advantageous protocol is selected from the protocols employed by the responses received at the client computer based at least in part on at least one of a data transfer rate and transmission control characteristics, said timeout period being measured from a transmitting time of a data request.

10. The method of claim 9 wherein selecting the most advantageous protocol comprises:

monitoring, employing said client computer, said subset of said responses as each one of said subset of said responses is received at said client computer from said server computer for a response employing said predefined best protocol; and designating said predefined best protocol said most advantageous protocol, thereby immediately permitting said client computer to employ said predefined best protocol for communication with said server computer without further receiving additional responses from said server computer.

11. The method of claim 9 wherein said computer network comprises the Internet and said predefined best protocol is UDP.

12. The method of claim 9 wherein said client computer is configured and arranged to execute an application for rendering real-time data as said real-time data is received from said server computer.

13. The method of claim 12 wherein said real-time data represents one of a video data stream, an audio data stream, and an annotation data stream.

14. The method of claim 13 wherein said data requests employ at least one of a UDP, TCP, HTTP proxy, HTTP 80, and HTTP 8080 protocols.

15. The method of claim 14 wherein said HTTP 80 protocol is a protocol for permitting multiple HTTP data streams to be transmitted in a multiplexed manner through port 80, said multiple HTTP data streams representing said video data stream and said audio data stream.

16. The method of claim 14 wherein said HTTP 8080 protocol is a protocol for permitting multiple HTTP data streams to be transmitted in a multiplexed manner through port 8080, said multiple HTTP data streams representing said video data stream and said audio data stream.

17. A computer-readable medium containing computer-readable instructions for automatically detecting a most advantageous protocol for communication by a client computer, said client computer being configured for coupling to a server computer via a computer network, said computer-readable instructions comprise:

computer-readable instructions for sending in a substantially parallel manner, from said client computer to said server computer, a plurality of data requests, each of said data requests employing a different protocol and a different connection, said data requests being configured to solicit, responsive to said data requests, a set of responses from said server computer, each of said responses employing a protocol associated with a respective one of said data requests;

computer-readable instructions for receiving at said client computer at least a subset of said responses;

computer-readable instructions for monitoring said subset of said responses as each response is received from said server computer to select said most advantageous protocol from protocols associated with said subset of said responses, wherein said most advantageous protocol is determined based on a predefined protocol priority that designates a predefined best protocol; and computer-readable instructions for, in response to expiration of a timeout period without receiving a response employing the predefined best protocol, selecting the most advantageous protocol from the protocols employed by the responses received at the client computer, the selection based at least in part on at least one of a data transfer rate and transmission control characteristics, said timeout period being measured from a transmitting time of a data request.

18. The computer-readable medium of claim 17 wherein said client computer, upon receiving a response employing said predefined best protocol, immediately designates said predefined best protocol said most advantageous protocol.

19. The computer-readable medium of claim 17 wherein at least one data request is sent using a multiplexed HTTP protocol.

20. The computer-readable medium of claim 17 wherein said client computer is configured and arranged to execute an application for rendering real-time data as said real-time data is received from said server computer.

21. The computer-readable medium of claim 17 wherein said computer network comprises the Internet and said predefined best protocol is UDP.

22. The computer readable medium of claim 21 wherein said real-time data represents one of a video data stream, an audio data stream, and an annotation data stream.

23. A computer-readable medium containing computer-readable instructions for automatically detecting a most advantageous protocol for communication by a client computer, said client computer being, configured for coupling to a server computer via a computer network, said computer-readable instructions comprise:

computer-readable instructions for sending from said client computer to said server computer, a plurality of data requests substantially in parallel, each of said data requests employing a different protocol and a different connection;

computer-readable instructions for receiving, at least a subset of said data requests at said server computer;

computer-readable instructions for sending a set of responses from said server computer to said client computer, said set of responses being responsive to said subset of said data requests, each of said responses employing a protocol associated with a respective one of said subset of said data requests;

computer-readable instructions for receiving at said client computer at least a subset of said responses; and computer-readable instructions for selecting, for said communication between said client computer and said server computer, said most advantageous protocol from protocols associated with said subset of said responses, wherein said most advantageous protocol is determined based on a predefined protocol priority that designates a predefined best protocol if a response employing the predefined best protocol is received at the client computer, and wherein, if a timeout period expires without the client computer receiving a response employing the predefined best protocol, the most advantageous protocol is selected from the protocols employed by the responses received at the client computer based at least in part on at least one of a data transfer rate and transmission control characteristics, said timeout period being measured from a transmitting time of a data request.

\* \* \* \* \*